US008059896B2

(12) United States Patent
Ito (10) Patent No.: US 8,059,896 B2
(45) Date of Patent: Nov. 15, 2011

(54) CHARACTER RECOGNITION PROCESSING SYSTEM AND COMPUTER READABLE MEDIUM STORING PROGRAM FOR CHARACTER RECOGNITION PROCESSING

(75) Inventor: Etsuko Ito, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 935 days.

(21) Appl. No.: 11/709,796

(22) Filed: Feb. 23, 2007

(65) Prior Publication Data

US 2007/0263930 A1 Nov. 15, 2007

(30) Foreign Application Priority Data

May 11, 2006 (JP) .................................. 2006-132655

(51) Int. Cl.
*G06K 9/34* (2006.01)
*G06K 9/72* (2006.01)
*G06K 9/00* (2006.01)
(52) U.S. Cl. ........ 382/177; 382/176; 382/178; 382/229; 382/321
(58) Field of Classification Search .................. 382/177, 382/176, 178, 229, 321
See application file for complete search history.

(56) References Cited

U.S. PATENT DOCUMENTS

| | | | | | |
|---|---|---|---|---|---|
| 5,077,805 | A | * | 12/1991 | Tan | 382/137 |
| 5,359,673 | A | * | 10/1994 | de La Beaujardiere | 382/229 |
| 5,455,872 | A | * | 10/1995 | Bradley | 382/228 |
| 5,491,760 | A | * | 2/1996 | Withgott et al. | 382/203 |
| 5,579,407 | A | * | 11/1996 | Murez | 382/164 |
| 5,619,592 | A | * | 4/1997 | Bloomberg et al. | 382/175 |
| 5,621,818 | A | * | 4/1997 | Tashiro | 382/227 |
| 5,764,799 | A | * | 6/1998 | Hong et al. | 382/225 |
| 5,805,747 | A | * | 9/1998 | Bradford | 382/310 |
| 5,819,247 | A | * | 10/1998 | Freund et al. | 706/25 |
| 5,821,929 | A | * | 10/1998 | Shimizu et al. | 382/190 |
| 6,327,382 | B1 | * | 12/2001 | Kaneda et al. | 382/164 |
| 6,661,919 | B2 | * | 12/2003 | Nicholson et al. | 382/173 |
| 7,031,519 | B2 | * | 4/2006 | Elmenhurst | 382/181 |
| 7,646,921 | B2 | * | 1/2010 | Vincent et al. | 382/225 |
| 2002/0006220 | A1 | * | 1/2002 | Kohchi | 382/165 |
| 2002/0015524 | A1 | * | 2/2002 | Fujiwara | 382/181 |
| 2002/0031263 | A1 | * | 3/2002 | Yamakawa | 382/199 |
| 2002/0067859 | A1 | * | 6/2002 | Nicholson et al. | 382/229 |

FOREIGN PATENT DOCUMENTS

| | | |
|---|---|---|
| JP | A 05-233705 | 9/1993 |
| JP | A 06-205175 | 7/1994 |
| JP | A 07-264390 | 10/1995 |
| JP | A 08-125878 | 5/1996 |
| JP | B2 2991779 | 10/1999 |

* cited by examiner

*Primary Examiner* — Matthew Bella
*Assistant Examiner* — Michael A Newman
(74) *Attorney, Agent, or Firm* — Oliff & Berridge, PLC (57) ABSTRACT

A character recognition processing system includes a character recognition confidence evaluating unit that evaluates whether confidence of character recognition of a plurality of areas are low or high, a character area classification unit that classifies a first area evaluated low by the character recognition confidence evaluating unit into a plurality of components, a character separation unit that separates the components classified by the character area classification unit into a character component and non-character components, according to information relating to a second area evaluated high by the character recognition confidence evaluating unit, and a first character recognition unit that performs character recognition processing for the character component separated by the character separation unit.

12 Claims, 9 Drawing Sheets

1h JAPANESE CHARACTER

CHARACTER RECOGNITION PROCESSING SYSTEM AND COMPUTER READABLE MEDIUM STORING PROGRAM FOR CHARACTER RECOGNITION PROCESSING

CROSS-REFERENCE TO RELATED APPLICATIONS

This and claims priority under 35 USC 119 from Japanese application is based on Patent Application No. 2006-132655 filed May 11, 2006.

BACKGROUND

1. Technical Field

The present invention relates to a character recognition processing system and a computer readable medium storing a program for character recognition processing.

2. Related Art

When paper document information is stored in electronic or digital form, a paper document is scanned, the scanned document information is converted into image data, and the image data is retained (electronic filing). During this operation, it is generally practiced to append any attribute or keyword to the image data in order to enhance the usability of the document in an image data format.

SUMMARY

According to an aspect of the invention, there is provided a character recognition processing system including a character recognition confidence evaluating unit that evaluates whether confidence of character recognition of a plurality of areas are low or high, a character area classification unit that classifies a first area evaluated low by the character recognition confidence evaluating unit into a plurality of components, a character separation unit that separates the components classified by the character area classification unit into a character component and non-character components, according to information relating to a second area evaluated high by the character recognition confidence evaluating unit, and a first character recognition unit that performs character recognition processing for the character component separated by the character separation unit.

BRIEF DESCRIPTION OF THE DRAWINGS

Exemplary embodiments of the present invention will be described in detail based on the following figures, wherein.

DETAILED DESCRIPTION

Now, various exemplary embodiments of the present invention will be described based on the drawings.

Figure 1:
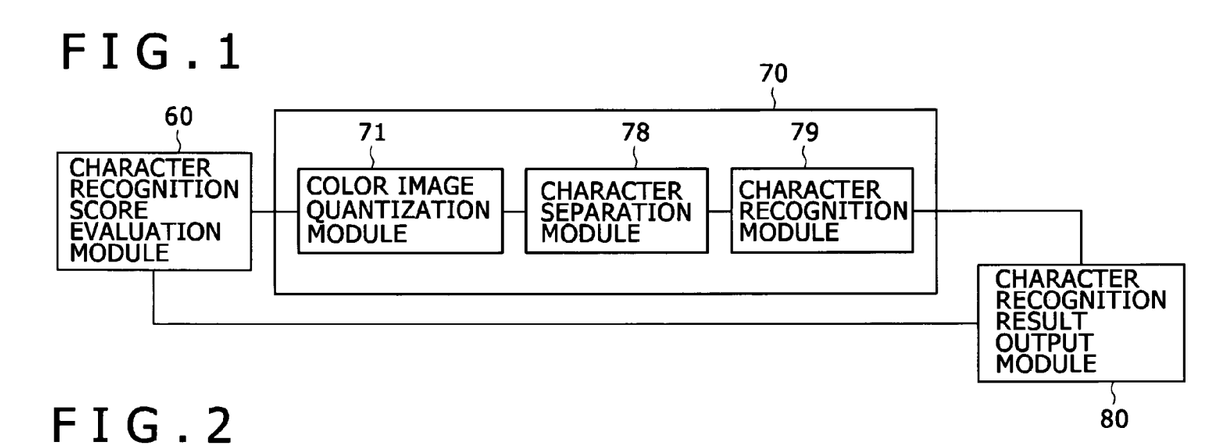
FIG. 1 is a block diagram showing an example of a configuration of a character recognition processing system.
Figure 2:
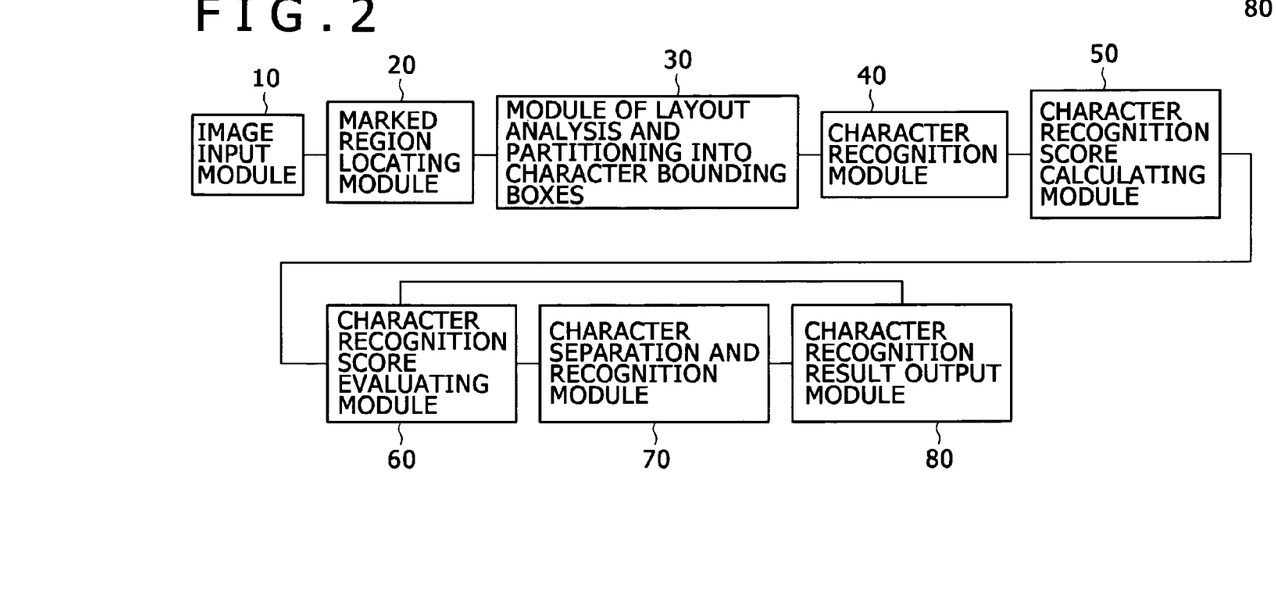
FIG. 2 is a block diagram showing an example of the entire character recognition processing system configuration.

FIGS. 1 through 7 illustrate a first exemplary embodiment of the invention. FIG. 1 shows an example of a conceptual configuration of modules for the first exemplary embodiment. FIG. 2 shows an example of a conceptual configuration of modules in an entire character recognition processing system (from image input to character recognition result output) including the modules shown in FIG. 1. Using FIGS. 1 and 2, the example of the conceptual configuration of the modules for the first exemplary embodiment is described.

Generally, modules refer to logically separable components of software and hardware. Therefore, the modules in the present exemplary embodiment refer to not only the modules of a program provided in a computer readable medium but also hardware component modules. Thus, the present exemplary embodiment involves the descriptions of a program embodied in a computer readable medium, a system, and a method. There is one-to-one correspondence between the modules and functions. In implementation, however, one module may be built as one sub-program or plural modules may be built as one sub-program. Inversely, one module may be built as plural sub-programs. Plural modules may be executed on one computer. One module may be executed on plural computers in a distributed or parallel environment. A term "connection" used hereinafter means both physical connection and logical connection.

A system may refer to both a system formed of plural computers, hardware units, devices, etc. connected via a network or the like and a system that is realized on a single computer.

The entire character recognition processing system which is the present exemplary embodiment, as shown in FIG. 2, is composed of an image input module 10, a marked region locating module 20, a module of layout analysis and partitioning into character bounding boxes 30, a character recognition module 40, a character recognition score calculating module 50, a character recognition score evaluating module 60, a character separation and recognition module 70, and a character recognition result output module 80. In particular, the character recognition score evaluating module 60, the character separation and recognition module 70, and the character recognition result output module 80 are placed in a relation as shown in FIG. 1. The internal structure of the character separation and recognition module 70 is made up of a color image quantization module 71, a character separation module 78, and a character recognition module 79.

The image input module 10 inputs image data that is subjected to character recognition processing, that is, image data of a document or the like including character images. Input may be, for example, image data scanned by a scanner, image data transmitted via a communication channel, or image data retrieved from a database where image data has been stored. Besides image data, input data may include a variety of data such as text data and attribute data such as layout information. It is assumed that a portion of character images of input image data is marked with a highlight pen and background-colored. Specifically, the highlight pen with a color ink other than black and white makes color marking on characters such that the characters under the marking can be read. It is assumed that the marker who makes the marking intends to store the marked portion as the title or an attribute of the document into a document database.

The marked region locating module 20 locates the portion marked with the highlight pen (hereinafter also referred to as a marked region) from the image data input by the image input module 10. In other words, it locates a character region that is background-colored from the image data. In particular, this is performed by extracting an image region having a tint color. An additional condition for locating such region may be that there is a black pixel region less than a certain size within that region. Further, an additional condition may be that the shape of the tint color image region is substantially oblong. Here, locating such region is, for example, extracting the top left and bottom right coordinates of the region. Here, the marked region includes characters, marking, and ground. The portions corresponding to the characters within the marked region are isolated through processing by the color image quantization module 71 and the character separation module 78.

The module of layout analysis and partitioning into character bounding boxes 30 performs layout analysis and partitioning into character bounding boxes for the image data processed by the marked region locating module 20. If layout information as attribute data is included in the image data input by the image input module 10, that information may be applied. If not, the layout analysis is based on the image data. The layout analysis defines sections such as character image regions, figure image regions, and photograph image regions involved in the image data. Also, it may include separating a character image region into lines, specifying attributes such as title, text body, and annotation, and specifying the orientation of a page image which is portrait or landscape.

The partitioning into character bounding boxes partitions a character image region into boxes, each bounding each of the characters present in the region, for the sake of character recognition by the following character recognition module 40. Here, the partitioning into character bounding boxes is performed by, for example, counting black pixels in the vertical direction, creating a histogram, and partitioning by each block of the black pixels. Binarizing is also performed for the character recognition by the character recognition module 40. Binary thresholding of the image data is performed by applying a preset threshold value; that is, for example, the image data is binarized into white [0] and black [1] by applying a threshold value that corresponds to a gray scale level.

The character recognition module 40 performs character recognition for the character image region partitioned into character bounding boxes and binarized by the module of layout analysis and partitioning into character bounding boxes 30. In other words, it recognizes character images and converts them into character code data.

The character recognition score calculating module 50 calculates the confidence of character recognition performed by the character recognition module 40. The confidence of character recognition termed herein is a calculated value indicating the reliability of character code data obtained as the result of the character recognition by the character recognition module 40.

The character recognition score evaluating module 60 evaluates the confidence of character recognition calculated by the character recognition score calculating module 50. The evaluation termed herein compares the value of confidence calculated for each character code data by the character recognition score calculating module 50 to a predetermined threshold value and determines whether the confidence is higher than or equal to the threshold value or lower than the threshold value as the result of the character recognition per character.

If the confidence is higher than or equal to the threshold value, the evaluating module passes the character code data to the character recognition result output module 80. If the confidence is lower than the threshold value, the process proceeds to the steps which are executed by the character separation and recognition module 70.

If the confidence of character code data within a same unit of layout is lower than character code data in other units, it may be regarded as low confidence. The units of layout are defined by the module of layout analysis and partitioning into character bounding boxes 30.

The steps to be executed by the character separation and recognition module 70 are performed for a character for which the character recognition confidence has been evaluated low by the character recognition score evaluating module 60. The steps are performed by the color image quantization module 71, the character separation module 78, and the character recognition module 79, as shown in FIG. 1.

The color image quantization module 71 classifies the area of a character image for which the character recognition confidence has been evaluated low by the character recognition score evaluating module 60 and for which character code data is to be generated into three components (character, marking, and ground components), using chroma (hue) information from the image data input by the image input module 10. In particular, the area of a character image for which the character recognition confidence of the character code data has been evaluated low is the area where a dark ink mark remains as black noise after the image data is binarized, typically appearing in the starting and trailing ends of a marking with the highlight pen. In most cases, the character component is black or gray, the ground component is white, and the marking component is colored; consequently, there are three distinct colors in the character area. Thus, using the chroma or hue information from the image data input by the image input module 10, the character area is broken down into the three components (character, marking, and ground components). This step may be referred to as color image quantization, color reduction, or color indexing. This limits the image having four or more levels of chroma or hue to three typical color components by quantizing the levels of chroma or hue (color reduction or indexing). At this point, the ground component is distinguishable as it is white, but the remaining components are not distinguishable between the character component and the marking component. The ground component does not need to be white, but the greatest area component having a color may be recognized as the ground.

The character separation module 78 separates the character component from within the three components into which the area of the character has been broken down by the color image quantization module 71. The separation module uses the image data for the characters within the background-colored character region, that is, the marked region located by the marked region locating module 20, including the character component to be separated. Then, identified as the character component is the image component having saturation closer to the black saturation for the areas of the characters for which the character recognition confidence has been evaluated high by the character recognition score is evaluating module 60. The reason for this is as follows. For the areas of the characters with the recognition confidence evaluated high, the character component and the marking component are plainly distinguishable. If the property of such character areas is close to that of the image component of interest, the latter can be said to have the same property. Thus, the separation module refers to the saturation values for the areas of the characters for which the recognition confidence has been evaluated high within the background-colored character region located by the marked region location module 20, including the character component to be separated. In particular, the character component is identified as the one whose saturation is close to the saturation of original pixels binarized to black in the referenced character image and the marking component is identified as the one whose saturation is close to the saturation of original pixels binarized to white within the same image.

The character recognition module 79 performs the same character recognition processing for the character component separated by the character separation module 78 as the foregoing character recognition module 40 does.

The separation step by the character separation module 78 may be skipped and the character recognition module 79 may carry out character recognition for the character component and the marking component, respectively, among the three components (character, marking, and ground components) into which the character area has been broken down by the color image quantization module 71. Then, the confidence of the character recognition may be calculated, respectively, for these components, and higher confidence may be taken as the character recognition result for the character.

The steps executed by the color image quantization module 71, the character separation module 78, and the character recognition module 79 will be detailed later, using FIGS. 6A through 6E.

The character recognition result output module 80 receives character code data, the result of the character recognition from the character recognition score evaluating module 60 or the character recognition module 79. Then, the output module 40 outputs the character code data to another system. For example, the output module 80 appends the result of the character recognition to the original image input by the image input module 10 as its title or attribute and stores the image data into a database of a documentation system such as a filing system.

Figure 3:
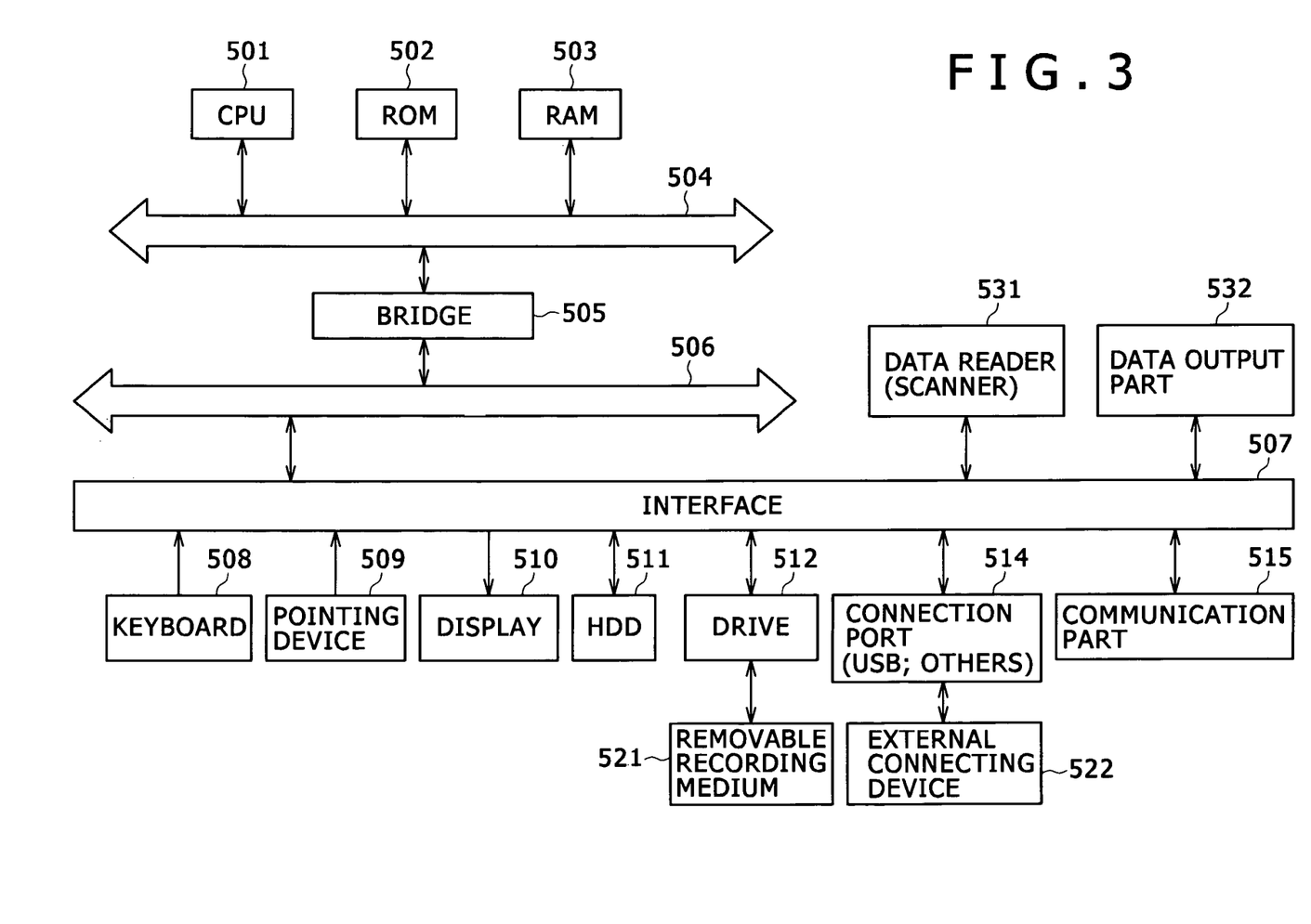
FIG. 3 illustrates an example of a hardware configuration of the character recognition processing system.

Referring to FIG. 3, an example of a hardware configuration of the character recognition processing system of the exemplary embodiment is described. The configuration shown in FIG. 3 is, for example, a character recognition processing system constructed by a personal computer (PC) or the like and represents an example of a hardware configuration including a data reader 531 such as a scanner and a data output part 532 such as a printer.

A CPU (Central Processing Unit) 501 is a controller that performs processing according to a computer program which is embodied in a compute readable medium, the program describing the execution sequences of each of the above-described several modules in the exemplary embodiment, namely, the character recognition score evaluating module 60, the color image quantization module 71, the character separation module 78, the character recognition module 79, the character recognition result output module 80, and others.

A ROM (Read Only Memory) 502 stores programs, operational parameters, and the like that are used by the CPU 501. A RAM (Random Access Memory) 503 stores programs to be executed by the CPU 501 and parameters which may appropriately vary during program execution. These memories are interconnected by a host bus 504 formed by a CPU bus or the like.

The host bus 504 is connected to an external bus 506 such as a PCI (Peripheral Component Interconnect/Interface) bus via a bridge 505.

A keyboard 508 and a pointing device 509 are input devices that are operated by an operator. A display 510 may be, typically, a CRT (Cathode Ray Tube) display used to display various data as text and image information.

A HDD (Hard Disk Drive) 511 contains a hard disk and drives the hard disk to write data into the disk or read a program to be executed by the CPU 501 or data from the disk. In the hard disk, an original input document, OCR result data, different binary thresholding methods (algorithms), different OCR engines, etc. may be stored. Furthermore, diverse computer programs such as various data processing programs may be stored.

A drive 512 reads data or a program recorded on a removable recording medium 521 such as a magnetic disk, an optical disk, a magnet-optical disk, or a semiconductor memory and supplies the data or program to the RAM 503 connected to the drive via an interface 507, the external bus 506, the bridge 505, and the host bus 504. The removable recording medium 521 may be used as a data storage space in a similar manner as the hard disk.

A connection port 514 is a port through which an external connecting device 522 is connected to the system and has a connector such as USB or IEEE 1394. The connection port 514 is connected to the interface 507 via which it is connected to the CPU 501 and associated components via the external bus 506, bridge 505, and host bus 504. A communication part 515 is connected to a network and performs processing for data communication with the outside. The data reader 531 is, for example, a scanner and executes document reading. The data output part 532 is, for example, a printer and executes document data output processing.

The hardware configuration of the character recognition processing system shown in FIG. 3 represents an example of its configuration. The character recognition processing system of the present exemplary embodiment is not limited to the configuration shown in FIG. 3, and any configuration is possible, provided that it allows the modules described in the present exemplary embodiment to be executed. For example, such a form may be possible that a subset of the modules is configured as hardware for specific use, whereas the remaining subset of the modules is provided in an external system and transferred to the system via a communication channel connected to the system. Furthermore, plural systems as shown in FIG. 3 may be provided and interconnected via a communication channel or channels, and the systems may operate cooperatively with each other.

Figure 4:
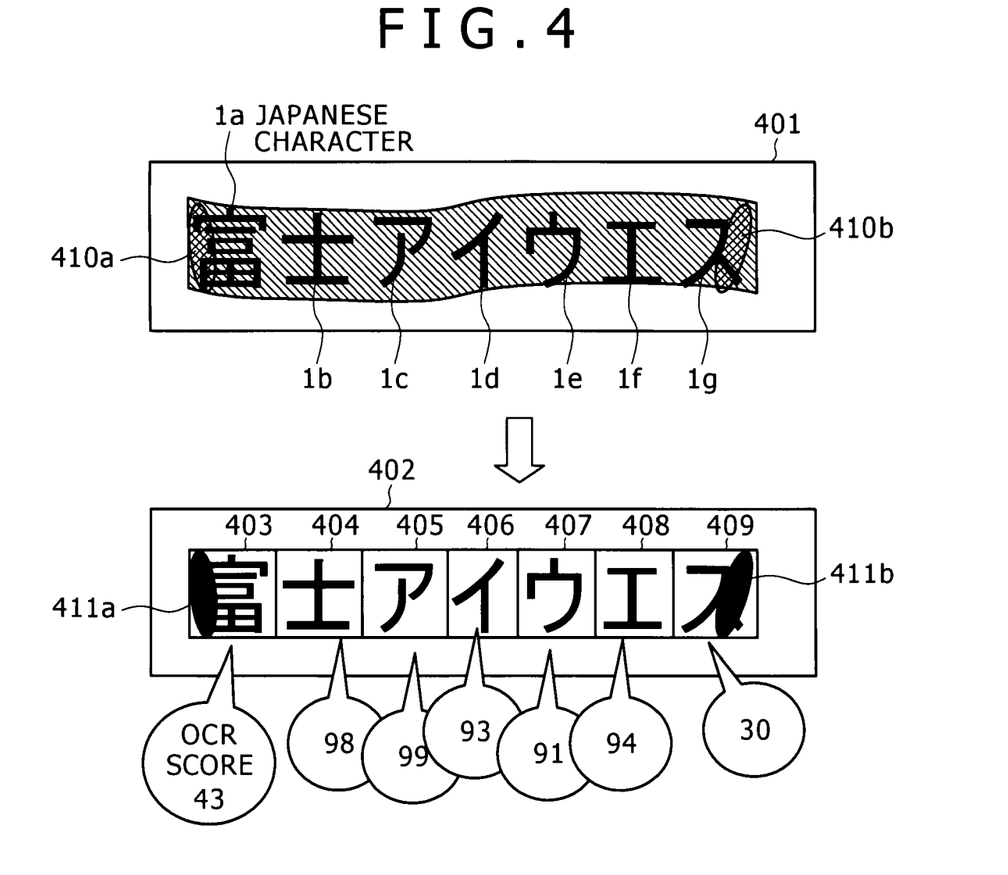
FIG. 4 illustrates an example of a result of character recognition for a marked character string.

Next, actions and functions (operations) are described, using FIGS. 4 through 7. Using FIG. 4, an example of a result of character recognition for a character string marked with a highlight pen is discussed. A marked region (original image) 401 is a portion of an original image which has been input by the image input module 10 and this portion is marked with the highlight pen. As a character image, "1a 1b 1c 1d 1e 1f 1g" (an example of word formation; expressed in representative numerals) is a string on which a marking is made with the highlight pen, wherein the marking starting end (original image) 410a and the marking trailing end (original image) 410b which correspond to the marking start position and the marking end position are darker than the other part of the marking. In FIG. 4, the darker marking portions (the marking starting end (original image) 410*a* and the marking trailing end (original image) 410*b*) are cross hatched and the plain marking potion is hatched.

For this image region, after binarizing and portioning into character bounding boxes are performed by the module of layout analysis and partitioning into character bounding boxes 30, its appearance becomes like a marked region (binarized) 402 as shown lower in FIG. 4. In particular, the marked region (original image) 401 is binarized into a binary image having the pixels which are either white [0] or black [1] and partitioned into seven character bounding boxes (for the first character 403 to seventh character 409). More specifically, the region is partitioned into a box for the first character 403 enclosing a binary image of "1a", a box for the second character 404 enclosing a binary image of "1b", a box for the third character 405 enclosing a binary image of "1c", a box for the fourth character 406 enclosing a binary image of "1d", a box for the fifth character 407 enclosing a binary image of "1e", a box for the sixth character 408 enclosing a binary image of "1f", and a box for the seventh character 409 enclosing a binary image of "1g". The first character 403 bounding box includes a marking starting end (binarized) 411*a* into which the marking starting end (original image) 410*a* has been binarized and the seventh character 409 bounding box includes a marking trailing end (binarized) 411*b* into which the marking trailing end (original image) 410*b* has been binarized.

Moreover, after character recognition processing is performed by the character recognition module 40, the confidence of the character recognition ("OCR score" in FIG. 5) for each character is calculated by the character recognition score calculating module 50. As a result, the first character 403 is given 43 points, the second character 404 is given 98 points, the third character 405 is given 99 points, the fourth is given 406 is given 93 points, the fifth character 407 is given 91 points, the sixth character 408 is given 94 points, and the seventh character 409 is given 30 points. The confidence scores of the first character 403 and the seventh character 409 are low, because their bounding boxes include the marking starting end (binarized) 411*a* and the marking trailing end (binarized) 411*b*, respectively.

Figure 5:
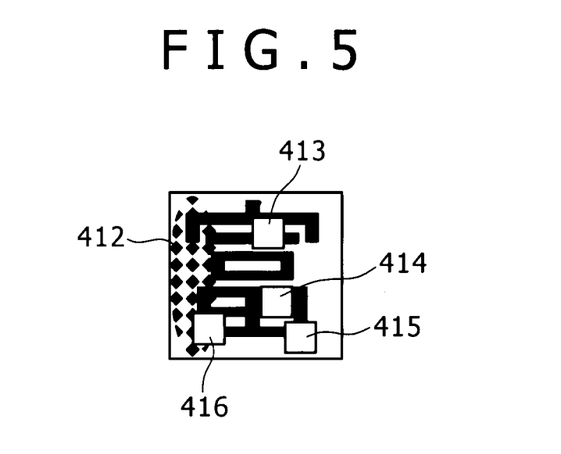
FIG. 5 illustrates an example of a character image binarized by changing an initial binary threshold value.

Here, it is possible to execute binarization again for the image areas of the boxes for characters with low character recognition confidence and execute the character recognition processing by the character recognition module 40 again. Unlike the first binarizing, the second binarizing is the one that is called, for example, floating binarization. In the floating binarization, the binary threshold value may be changed for different local areas.

However, even if the second binarization is performed, the confidence of character recognition may not be improved in some case. Such a case is discussed, using FIG. 5. FIG. 5 shows an example of floating binarization for the original image area of the first character 403. The binarization is adapted to make the portion of the marking starting end (original image) 410*a* as close to white as possible and make only the character portion black. As a result, the dark marking appears to be a checkered pattern like a marking starting end (binarized again) 412 and thin portions of the character are whitened like thin spots 413 to 416. In such case, the second binarization is not effective for improving the character recognition confidence. In the present exemplary embodiment, thus, the processing steps as illustrated in FIGS. 6A to 6E are performed.

Using FIGS. 6A to 6E, the steps that are executed by the color image quantization module 71, the character separation module 78, and the character recognition module 79 are explained. In FIGS. 6A-6E, a dark marking portion (e.g., the marking starting end (original image) 410*a*) is cross hatched and the plain marking portion is hatched.

Figure 6A:
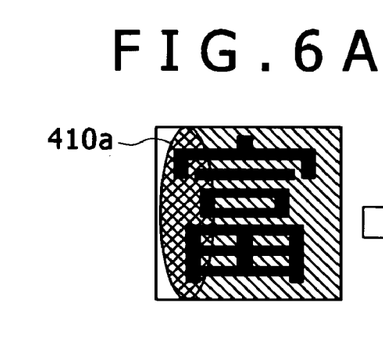
FIGS. 6A through 6E illustrate an example of character separation using color image quantization.

FIG. 6A shows the original image of the character bounding box for the first character 403 for which the character recognition confidence calculated by the character recognition score calculating module 50 is low. This image is an extraction of a partial area of an image input by the image input module 10 and a multilevel image before binarized. Because this area includes the marking starting end (original image) 410*a*, the character recognition confidence is low.

Figure 6B:
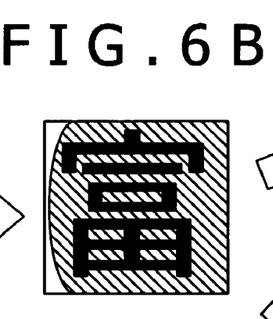

The color image quantization module 71 limits the colors of the image of FIG. 6A. Color image quantization groups the colors into three colors, using the chroma of the image of interest. If the marking with the highlight pen is, for example, green, grouping the colors into white, black, and green is performed. For colors other than white and black, the most frequently occurring value of chroma in the image of interest is used. The chroma values of the pixels which are close to the most frequently occurring value are converted to the latter value. An image after the change into three colors is as shown in FIG. 6B. The marking starting end (original image) 410*a* is converted into the same color as the color of the remaining marking portion (hatched marking portion). The pixels within the image of FIG. 6B have any of the three colors. The image of FIG. 6B is broken down by color into the components which are shown in FIGS. 6C, 6D, and 6E, respectively.

At this point, the image components other than the ground are not distinguishable between the character component and the marking component. Then, the character separation module 78 separates the character component. Distinguishing between the character component of FIG. 6C and the marking component of FIG. 6D is made. Its method is to identify the component whose saturation data is close to the saturation data of a character marked by the same marking color and with high character recognition confidence (FIG. 6C), for example, the third character 405 (99 points of confidence) as the character component. A range of the characters marked by the same marking color is determined from the result of the operation by the marked region locating module 20 or the module of layout analysis and partitioning into character bounding boxes 30.

Then, the character recognition module 79 performs character recognition for the character component separated by the character separation module 78.

Figure 6C:
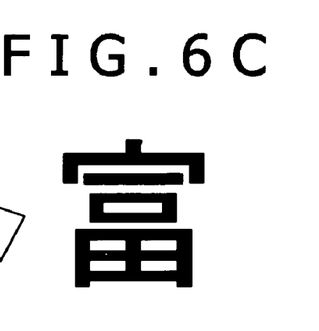
Figure 6D:
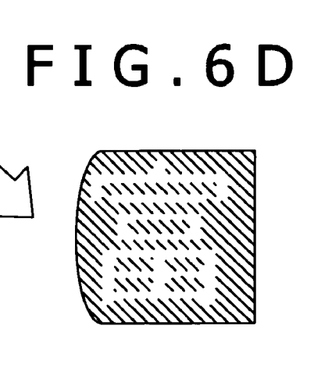
Figure 6E:
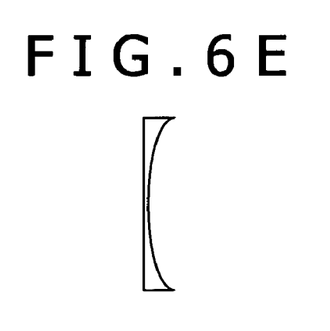

Skipping the operation by the character separation module 78, the character recognition module 79 may perform character recognition for both images of FIG. 6C and FIG. 6D. In this case, the image for which the character recognition confidence is higher is taken as the character image.

Figure 7:
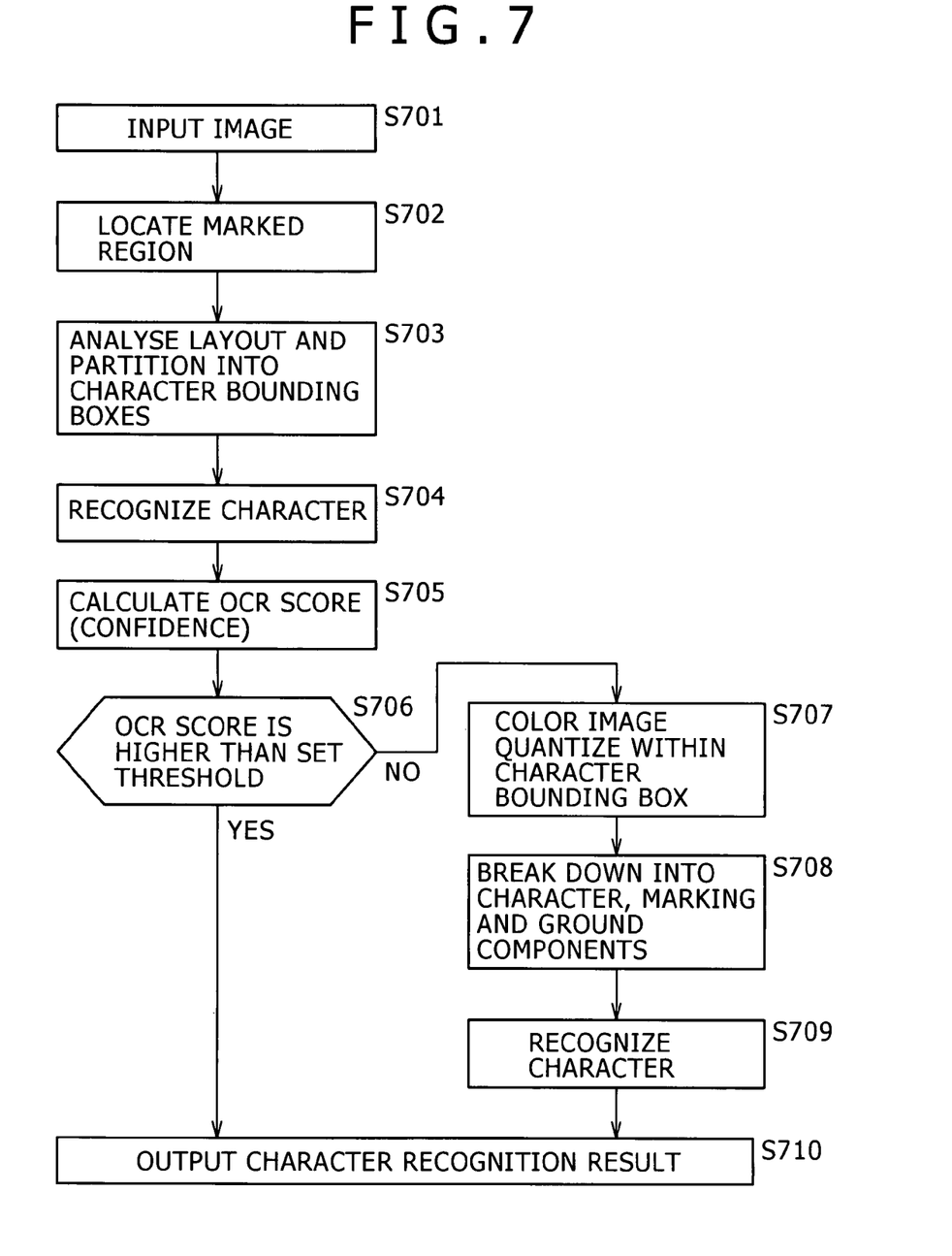
FIG. 7 is a flowchart describing character recognition processing that is performed by the character recognition processing system.

Next, using FIG. 7, the character recognition processing that is performed by the character recognition processing system which is the first exemplary embodiment is described.

At step S701, the image input module 10 inputs image data.

At step S702, the marked region locating module 20 locates a region marked with the highlight pen within the image data.

At step S703, the module of layout analysis and partitioning into character bounding boxes 30 performs layout analysis of the image data. This is followed by partitioning an character image region into character bounding boxes so that character recognition processing is performed character by character.

At step S704, the character recognition module 40 performs character recognition processing for the images of the respective characters obtained at step S703.

At step S705, the character recognition score calculating module 50 calculates the confidence of the character recognition carried out at step S704.

At step S706, the character recognition score evaluating module 60 determines whether a reliable result has been obtained from the character recognition confidence; otherwise, further steps S707 to S709 are to be executed.

At step S707, if the determination made at step S706 is "no", the color image quantization module 71 performs color liming for a character image for which the character recognition confidence is low and classifies the character area into three components (character, marking, and ground components).

At step S708, the three components are classified as the character, marking and ground. That is, the greatest area component or white component is identified as the ground component and the character separation module 78 extracts the character component from the three components, using the results of step S703 and step S705.

At step S709, the character recognition module 79 performs character recognition processing for the character component extracted at step S708.

At step S710, the character recognition result output module 80 receives character code data which is a result of the processing of step S704, if the determination made at step S706 is "yes", and character code data which is a result of the processing of step S709, appends the character code data to the image data input at step S701 as its title or attribute information, and outputs the image data to the external system.

Figure 8:
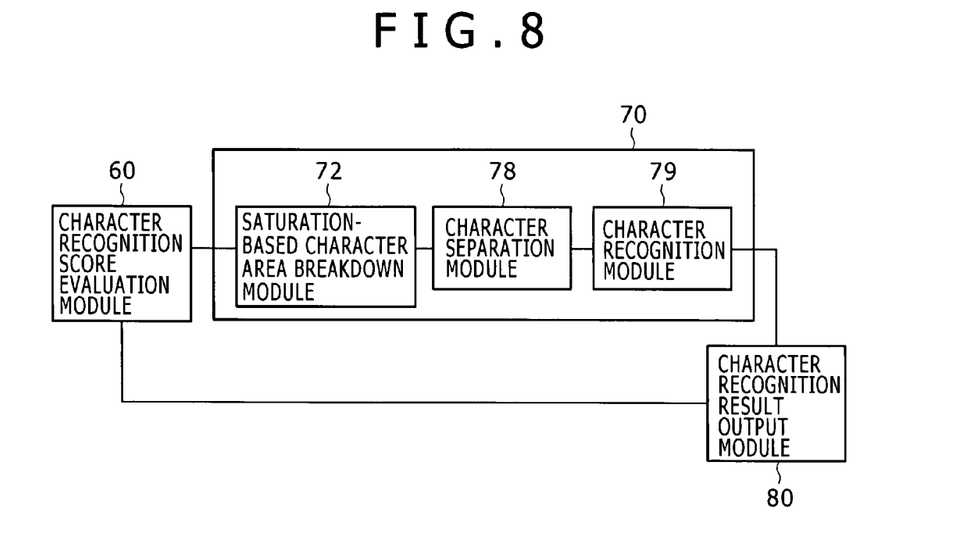
FIG. 8 is a block diagram showing an example of the entire character recognition processing system configuration.
Figure 9A:
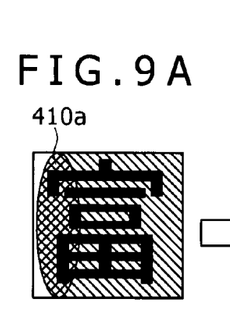
FIGS. 9A to 9E illustrate an example of character separation using saturation information.
Figure 9B:
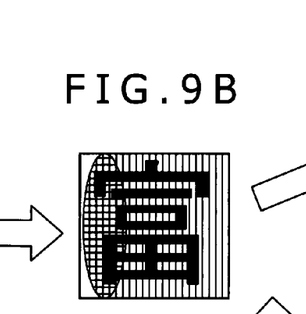
Figures 9C, 9D:
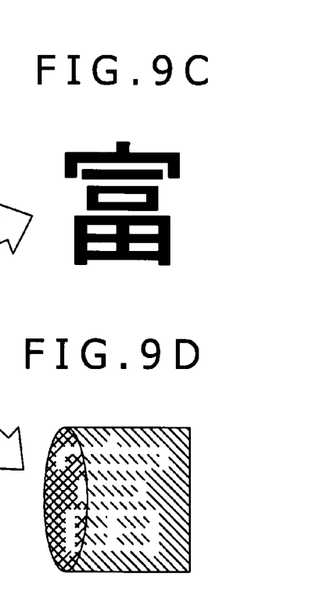
Figure 9E:
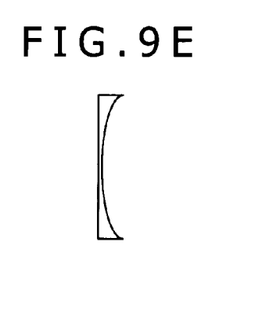
Figure 10:
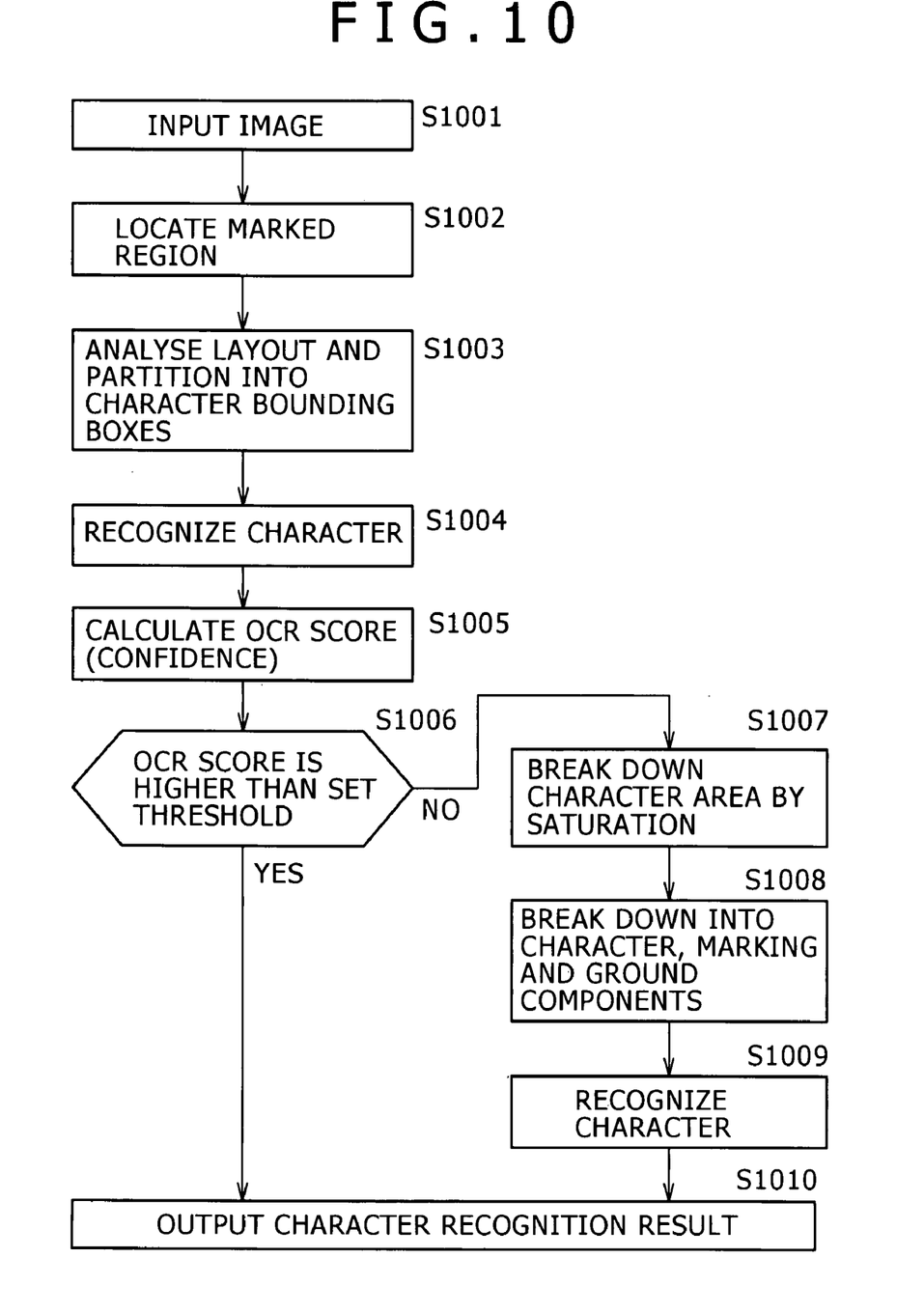
FIG. 10 is a flowchart describing character recognition processing that is performed by the character recognition processing system.

FIGS. 8 through 10 illustrate a second exemplary embodiment of the invention.

In the second exemplary embodiment, a saturation-based character area classification module 72 replaces the color image quantization module 71 in the first exemplary embodiment.

Parts corresponding to those in the first exemplary embodiment are assigned the same reference numbers and their explanation is not repeated.

The same example of the configuration of modules in the entire character recognition processing system and the same example of the hardware configuration as described with FIGS. 2 and 3, respectively, also apply to the second exemplary embodiment.

FIG. 8 shows an example of a conceptual configuration of the modules for the second exemplary embodiment.

The character recognition score evaluating module 60, the character separation module 78, the character recognition module 79, and the character recognition result output module 80 perform the same processing steps as in the first exemplary embodiment.

The saturation-based character area classification module 72 classifies the area of a character image for which the character recognition confidence has been evaluated low by the character recognition score evaluating module 60 and for which character code data is to be generated into three components (character, marking, and ground components), using saturation information from the image data input by the image input module 10. In particular, for example, using the a* and b* values in the Lab color space, the classification into the character component and ground component having no saturation and the marking component having saturation is carried out.

Using FIGS. 9A to 9E, the steps that are executed by the saturation-based character area classification module 72, the character separation module 78, and the character recognition module 79 are further explained. In FIGS. 9A to 9E, a dark marking portion (e.g., the marking starting end (original image) 410a) is cross hatched and the plain marking portion is hatched.

FIG. 9A shows the original image of the character bounding box for the first character 403 for which the character recognition confidence calculated by the character recognition score calculating module 50 is low. This image is an extraction of a partial area of an image input by the image input module 10 and a multilevel image before binarized.

For the image of FIG. 9A, the saturation-based character area classification module 72 classifies its area into components, using saturation information. In other words, the classification is grouping into the character component and the ground component having no saturation and the marking component having saturation, using the saturation of the image of interest. Because of having saturation, the marking portion marked with the highlight pen is distinguishable from the character component and the ground component. An image based on only the saturation information is as shown in FIG. 9B. In FIG. 9B, the portion with saturation is hatched. The marking component has subareas with different levels of saturation and is divided into the marking staring end (the grid hatched portion in FIG. 9B) and the plain marking portion (vertically hatched portion in FIG. 9B). The original image (FIG. 9A) is broken down by saturation into the components which are shown in FIGS. 9C, 9D, and 9E, respectively.

At this point, the image components other than the ground are not distinguishable between the character component and the marking component. Then, the character separation module 78 separates the character component. Distinguishing between the character component of FIG. 9C and the marking component of FIG. 9D is made. Its method is the same as done by the character separation module 78 in the first exemplary embodiment.

Then, the character recognition module 79 performs character recognition for the character component separated by the character separation module 78.

Skipping the operation by the character separation module 78, the character recognition module 79 may perform character recognition for both images of FIG. 9C and FIG. 9D. In this case, the image for which the character recognition confidence is higher is taken as the character image.

Next, using FIG. 10, the character recognition processing that is performed by the character recognition processing system which is the second exemplary embodiment is described.

Steps S1001 to S1006 are the same as the steps S701 to S706 for the first exemplary embodiment.

At step S1007, if the determination made at step S1006 is "no", the saturation-based character area classification module 72 classifies the area of a character image for which the character recognition confidence is low into three components (character, marking, and ground components), using saturation information.

Steps S1008 to S1010 are the same as the steps S708 to S710 for the first exemplary embodiment.

Figure 11:
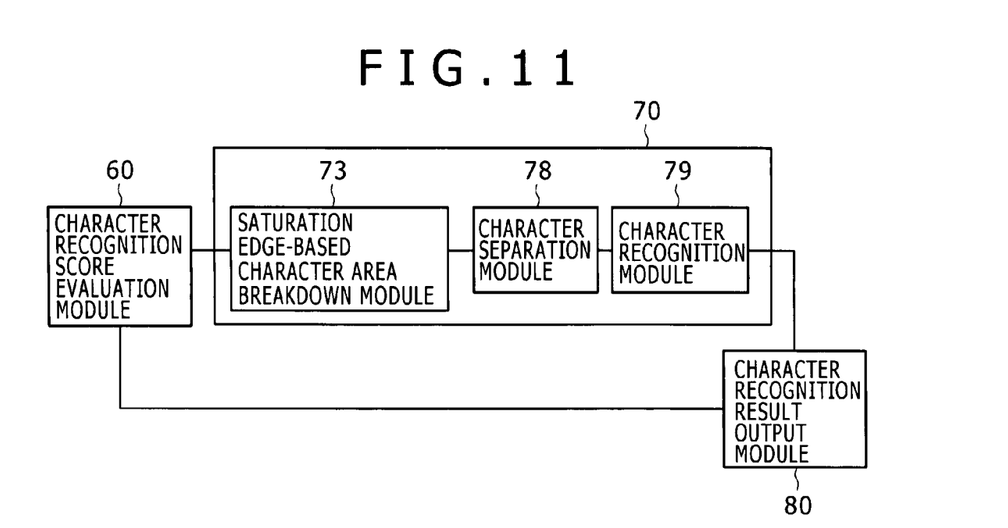
FIG. 11 is a block diagram showing an example of the entire character recognition processing system configuration.
Figures 12A, 12B:
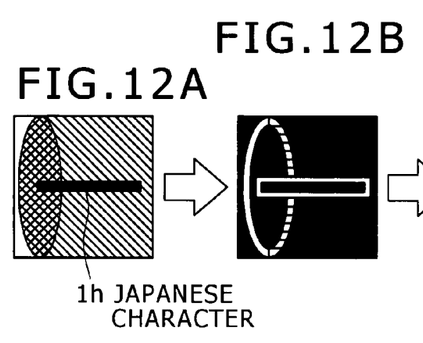
FIGS. 12A to 12F illustrate an example of character separation using saturation edges.
Figure 12C:
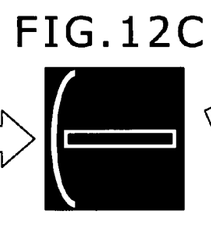
Figure 12D:
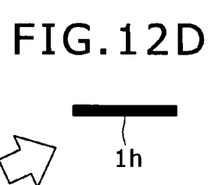
Figure 12E:
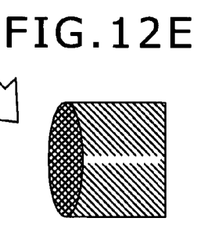
Figure 12F:
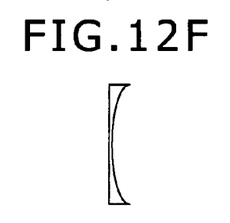
Figure 13:
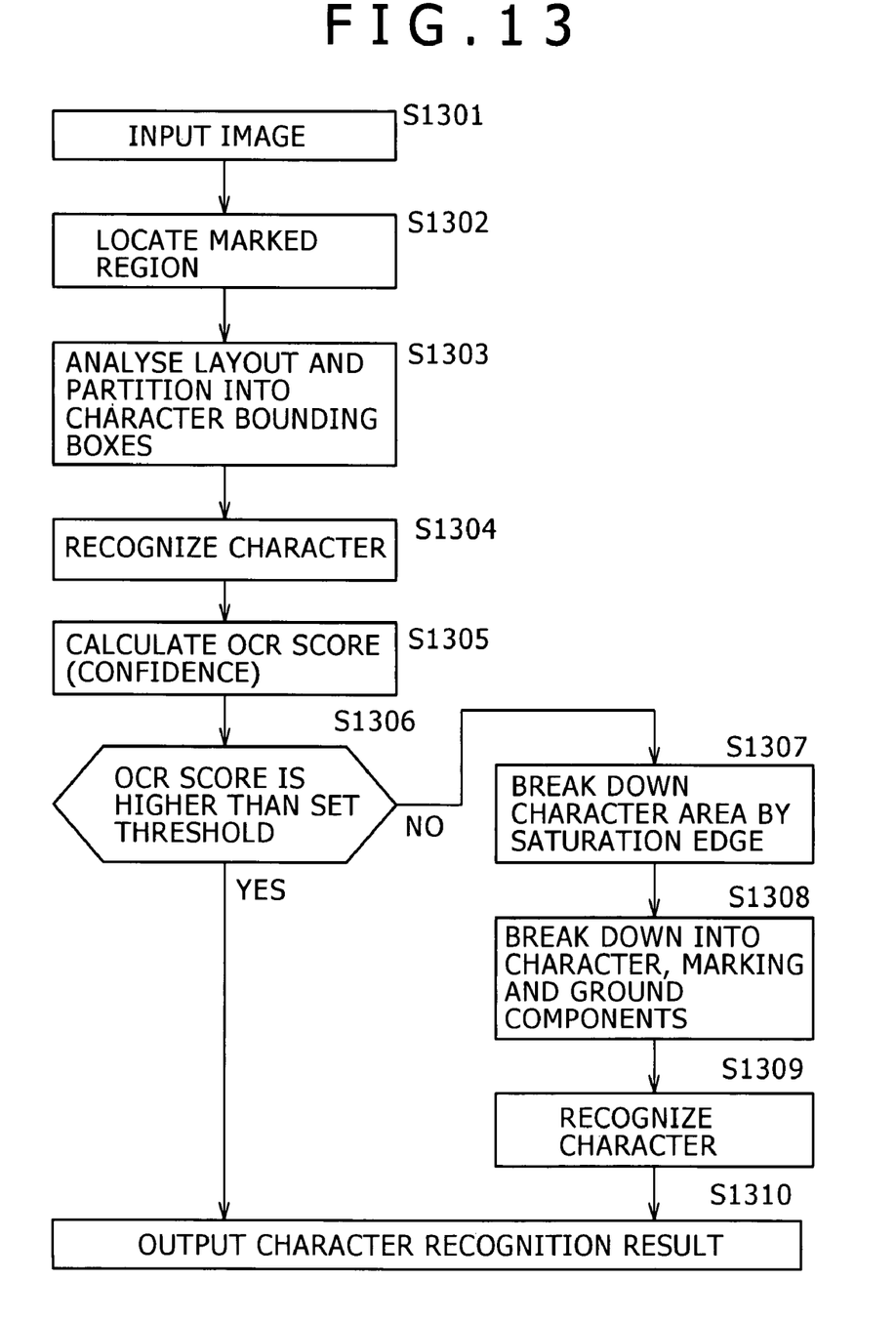
FIG. 13 is a flowchart describing character recognition processing that is performed by the character recognition processing system.

FIGS. 11 through 13 illustrate a third exemplary embodiment of the invention.

In the third exemplary embodiment, a saturation edge-based character area classification module 73 replaces the color image quantization module 71 in the first exemplary embodiment.

Parts corresponding to those in the first exemplary embodiment are assigned the same reference numbers and their explanation is not repeated.

The same example of the configuration of modules in the entire character recognition processing system and the same example of the hardware configuration as described with FIGS. 2 and 3, respectively, also apply to the third exemplary embodiment.

FIG. 11 shows an example of a conceptual configuration of the modules for the third exemplary embodiment.

The character recognition score evaluating module 60, the character separation module 78, the character recognition module 79, and the character recognition result output module 80 perform the same processing steps as in the first exemplary embodiment.

The saturation edge-based character area classification module 73 classifies the area of a character image for which the character recognition confidence has been evaluated low by the character recognition score evaluating module 60 and for which character code data is to be generated into three components (character, marking, and ground components), using edges in saturation information from the image data input by the image input module 10. In particular, for example, using the a* and b* values in the Lab color space, the character image is converted to an image based entirely on saturation and only edges are extracted from the image based entirely on saturation. By the edge-based division, the image is broken down into the character, ground, and marking components.

Using FIGS. 12A to 12F, the steps that are executed by the saturation edge-based character area classification module 73, the character separation module 78, and the character recognition module 79 are further explained. In FIGS. 12A to 12F, a dark marking portion (e.g., the marking starting end (original image)) is cross hatched and the plain marking portion is hatched.

FIG. 12A shows the original image of the character bounding box for a character for which the character recognition confidence calculated by the character recognition score calculating module 50 is low (a character "1h" is used as an example). This image is an extraction of a partial area of an image input by the image input module 10 and a multilevel image before binarized.

For the image of FIG. 12A, the saturation-based character area classification module 72 classifies its area into components, using saturation edge information. In particular, the classification module draws out edges from an image based entirely on saturation of the image of interest. The image formed of the edges is a multilevel image as shown in FIG. 12B. In FIG. 12B, among the edges, one having a lower value is transverse hatched. By binarizing this image, only clear edges remain among the saturation edges. This state is an image as shown in FIG. 12C, where the right edge portion (the hatched portion in FIG. 12B) of the marking starting end (original image) is erased. This is because the right edge portion of the marking starting end contacts with the plain marking portion and there is no noticeable difference in density between the right edge portion and the plain marking portion. By the edges, the original image (FIG. 12A) is broken down into three components which are shown in FIGS. 12D, 12E, and 12F, respectively.

At this point, the image components other than the ground are not distinguishable between the character component and the marking component. Then, the character separation module 78 separates the character component. Distinguishing between the character component of FIG. 12D and the marking component of FIG. 12E is made. Its method is the same as done by the character separation module 78 in the first exemplary embodiment.

Then, the character recognition module 79 performs character recognition for the character component separated by the character separation module 78.

Skipping the operation by the character separation module 78, the character recognition module 79 may perform character recognition for both images of FIG. 12D and FIG. 12E. In this case, the image for which the character recognition confidence is higher is taken as the character image.

Next, using FIG. 13, the character recognition processing that is performed by the character recognition processing system which is the third exemplary embodiment is described.

Steps S1301 to S1306 are the same as the steps S701 to S706 for the first exemplary embodiment.

At step S1307, if the determination made at step S1306 is "no", the saturation edge-based character area classification module 73 classifies the area of a character image for which the character recognition confidence is low into three components (character, marking, and ground components), using saturation edge information.

Steps S1308 to S1310 are the same as the steps S708 to S710 for the first exemplary embodiment.

While, in the foregoing exemplary embodiments, the characters marked with the highlight pen are mainly shown as the objects of character recognition processing, this processing is applicable to any form of a character region that is background-colored other than by marking with the highlight pen. The background color does not need to be a specific color, but may vary in tone.

In the foregoing exemplary embodiments, the character separation module 78 uses saturation information of character images for which the character recognition confidence is high. Instead, the character area may be separated into components, according to the areas of the three respective components which have already been defined. The reason for this is that, in most cases, the marking component occupies the largest area and the character component area is the second largest. Alternatively, the character area may be separated into components, according to the shapes of the three respective regions which have already been defined. This makes advantage of the features of the components, such as: the marking component is substantially oblong; and the ground component is along an edge of the oblong.

In the forgoing exemplary embodiments, after the steps by the character recognition module 40, the character recognition score calculating module 50, and the character recognition score evaluating module 60 are executed, the steps by the character separation and recognition module 70 are executed (the steps that are executed by the color image quantization module 71, the character separation module 78, and the character recognition module 79 in the first exemplary embodiment, the steps that are executed by the saturation-based character area classification module 72, the character separation module 78, and the character recognition module 79 in the second exemplary embodiment, the steps that are executed by the saturation edge-based character area classification module 73, the character separation module 78, and the character recognition module 79 in the third exemplary embodiment). Instead, the steps by the character recognition module 40, the character recognition score calculating module 50, and the character recognition score evaluating module 60 may be skipped. Following the step by the module of layout analysis and partitioning into character bounding boxes 30 the steps, the steps by the character separation and recognition module 70 may be executed. That is, the color image quantization module 71, the saturation-based character area classification module 72, or the saturation edge-based character area classification module 73 classifies the area of a character for which character recognition processing is to be performed into plural components. The character separation module 78 separates the components into which the character area has been broken down by the color image quantization module 71, the saturation-based character area classification module 72, or the saturation edge-based character area classification module 73 into the character component and the non-character components. The character recognition module 79 performs character recognition processing for the character component separated by the character separation module 78. During the above operation, the color image quantization module 71 performs the classification by color, the saturation-based character area classification module 72 performs the classification by saturation, and the saturation edge-based character area classification module 73 performs the classification by saturation edge.

Additionally, the procedure may be modified as follows. The color image quantization module 71, the saturation-based character area classification module 72, or the saturation edge-based character area classification module 73 classifies the area of a character for which character recognition processing is to be performed into plural components. The character recognition module 79 performs character recognition processing for each of the components into which the character area has been broken down by the color image quantization module 71, the saturation-based character area classification module 72, or the saturation edge-based character area classification module 73, and judges a component for which the character recognition confidence is high as the character component. The color image quantization module 71 performs the classification by color, the saturation-based character area classification module 72 performs the classification by saturation, and the saturation edge-based character area classification module 73 performs the classification by saturation edge.

The described program may be stored into a recording medium. In this case, for example, an aspect of the present invention can be understood as a computer readable medium storing a program for character recognition processing, the program causing a computer to perform:

a character recognition confidence evaluating function that evaluates confidence of character recognition;

a character area classification function that, for a character for which character recognition confidence has been evaluated low by the character recognition confidence evaluating function and for which character recognition processing is to be executed, classifies its area into plural components;

a character separation function that separates the components into which the character area has been broken down by the character area classification function into a character component and non-character components, according to information relating to the areas of characters evaluated high in terms of the character recognition confidence by the character recognition confidence evaluating function; and a character recognition function that performs character recognition processing for the character component separated by the character separation function.

Another aspect of the invention relates to a computer readable medium storing a program for character recognition processing, the program causing a computer to perform:

a character recognition confidence evaluating function that evaluates confidence of character recognition;

a character area classification function that, for a character for which character recognition confidence has been evaluated low by the character recognition confidence evaluating function and for which character recognition processing is to be executed, classifies its area into plural components;

a character recognition function that performs character recognition processing for the components into which the character area has been broken down by the character area classification function; and a character recognition judging function that judges a component for which the confidence of the character recognition performed by the character recognition function is high as a character component.

The "computer readable medium storing a program" refers to a computer readable medium in which a program is stored and which is used for installing and executing the program and for distributing the program.

The recording medium may be any type of the following: e.g., a digital versatile disk (DVD) which may be available as "DVD-R, DVD-RW, DVD-RAM, and the like" compliant with the standards laid down by the DVD Forum and "DVD+R, DVD+RW, and the like" compliant with the standards laid down by the DVD+RW, a compact disk (CD) which may be available as a read only memory (CD-ROM), CD recordable (CD-R), CD rewritable (CD-RW), and the like, a magnet optical disk (MO), a flexible disk (FD), a magnetic tape, a hard disk, a read only memory (ROM), an electrically erasable programmable read-only memory (EEPROM), a flash memory, a random access memory (RAM), etc.

The above program or a part thereof may be recorded into the above recording medium, stored, or distributed. By communication, the program or a part thereof may be transmitted on a transmission medium such as, e.g., a local area network (LAN), a metropolitan area network (MAN), a wide area network (WAN), Internet, a wired network for use in intranet, extranet, and the like, or a wireless communication network, and any combination of these networks, or may be transported on a carrier.

Furthermore, the above program may be a part of another program or may be recorded together with another program into a recording medium.

The present invention may be embodied in other specific forms without departing from its spirit or essential characteristics. The described exemplary embodiments are to be considered in all respects only as illustrated and not restrictive. The scope of the invention is, therefore, indicated by the appended claims rather than by the foregoing description. All changes which come within the meaning and range of equivalency of the claims are to be embraced within their scope.

What is claimed is:

1. A character recognition processing system, comprising:
a character recognition confidence evaluating unit that evaluates whether confidence of character recognition of a plurality of areas including a character are low or high;
a character area classification unit that classifies a first area evaluated low by the character recognition confidence evaluating unit into a plurality of components;
a character separation unit that separates the components classified by the character area classification unit into a character component and non-character components, according to information relating to a second area evaluated high by the character recognition confidence evaluating unit, the non-character components including a marking component and a ground component, the marking component being defined by an area of the plurality of areas having been marked by a highlighting pen;
a first character recognition unit that performs character recognition processing for the character component separated by the character separation unit;
a background-colored character region locating unit that locates a background-colored character region from an image, the background-colored character region being the areas having been marked by the highlighting pen;
a character partition unit that partitions the background-colored character region located by the background-colored character region locating unit into areas including a character;
a second character recognition unit that performs character recognition for each of the areas including the character partitioned by the character partition unit; and
a character recognition confidence calculating unit that calculates the confidence of the character recognition performed by the second character recognition unit,
wherein the second area evaluated high in terms of the character recognition confidence by the character recognition confidence evaluating unit, which is used by the character separation unit, falls within the background-colored character region located by the background-colored character region locating unit, the region including the area of the character components to be separated, and
wherein at least one of the above units comprises a hardware module.

2. A character recognition processing system, comprising:
a character recognition confidence evaluating unit that evaluates whether confidence of character recognition of a plurality of areas including a character are low or high;
a character area classification unit that classifies a first area evaluated low by the character recognition confidence evaluating unit into a plurality of components, the plurality of components including a character component, a marking component and a ground component, the marking component being defined by an area of the plurality of areas having been marked by a highlighting pen;
a first character recognition unit that performs character recognition processing for each of the components that are classified by the character area classification unit; and
a character recognition judging unit that judges the component recognized as the character component when the confidence of the character recognition performed by the character recognition unit is high,
a background-colored character region locating unit that locates a background-colored character region from an image, the background-colored character region being the areas having been marked by the highlighting pen;
a character partition unit that partitions the background-colored character region located by the background-colored character region locating unit into areas including a character;
a second character recognition unit that performs character recognition for each of the areas including the character partitioned by the character partition unit; and
a character recognition confidence calculating unit that calculates the confidence of the character recognition performed by the second character recognition unit,
wherein a second area evaluated high in terms of the character recognition confidence by the character recognition confidence evaluating unit falls within the background-colored character region located by the background-colored character region locating unit, the region including the area of the character components to be separated, and
wherein at least one of the above units comprises a hardware module.

3. The character recognition processing system according to claim 1, wherein the character area classification unit performs the classification by color.

4. The character recognition processing system according to claim 1, wherein the character area classification unit performs the classification by saturation.

5. The character recognition processing system according to claim 1, wherein the character area classification unit performs the classification by saturation edge.

6. The character recognition processing system according to claim 1, wherein the information relating to the second area evaluated high in terms of the character recognition confidence by the character recognition confidence evaluating unit, which is used by the character separation unit, is saturation information.

7. The character recognition processing system according to claim 1, further comprising a title/attribute appending unit that appends a finally obtained result of character recognition to the image in process as title or attribute of the image.

8. A character recognition processing method, comprising:
evaluating confidence of character recognition;
classifying an area of a character to be subjected to character recognition processing into a plurality of components when the character recognition confidence of the area is evaluated low;
separating the components into a character component and non-character components, according to information relating to the areas of characters evaluated high in terms of the character recognition confidence, the non-character components including a marking component and a ground component, the marking component being defined by an area of the plurality of areas having been marked by a highlighting pen;
performing character recognition processing for the character component;
locating a background-colored character region from an image;
partitioning the background-colored character region into areas including a character, the background-colored character region being the areas having been marked by the highlighting pen;
performing character recognition for each of the areas including the character partitioned from the background-colored character region; and
calculating the confidence of the character recognition for each of the areas including the character partitioned from the background-colored character region,
wherein a second area evaluated high in terms of the character recognition confidence falls within the background-colored character region, the region including the area of the character component to be separated, and
wherein at least one of the above steps is performed by a processor.

9. A character recognition processing method, comprising:
evaluating confidence of character recognition;
classifying an area of a character to be subjected to character recognition processing into a plurality of components when the character recognition confidence of the area is evaluated low, the plurality of components including a character component, a marking component and a ground component, the marking component being defined by an area of the plurality of areas having been marked by a highlighting pen;
performing character recognition processing for each of the components;

judging the component recognized as the character component when the confidence of the character recognition is high;

locating a background-colored character region from an image;

partitioning the background-colored character region into areas including a character, the background-colored character region being the areas having been marked by the highlighting pen;

performing character recognition for each of the areas including the character partitioned from the background-colored character region; and calculating the confidence of the character recognition for each of the areas including the character partitioned from the background-colored character region, wherein a second area evaluated high in terms of the character recognition confidence falls within the background-colored character region, the region including the area of the character component to be separated, and wherein at least one of the above steps is performed by a processor.

10. A non-transitory computer readable medium storing a program causing a computer to execute a process for character recognition processing, the process comprising:

evaluating confidence of character recognition;

classifying an area of a character that the character recognition confidence evaluation is executed into a plurality of components when the character recognition confidence of the area is evaluated low;

separating the components that classified into a character component and non-character components, according to information relating to the areas of characters evaluated high in terms of the character recognition confidence, the non-character components including a marking component and a ground component, the marking component being defined by an area of the plurality of areas having been marked by a highlighting pen;

performing character recognition processing for the character component separated;

locating a background-colored character region from an image;

partitioning the background-colored character region into areas including a character, the background-colored character region being the areas having been marked by the highlighting pen;

performing character recognition for each of the areas including the character partitioned from the background-colored character region; and calculating the confidence of the character recognition for each of the areas including the character partitioned from the background-colored character region, wherein a second area evaluated high in terms of the character recognition confidence falls within the background-colored character region, the region including the area of the character components to be separated.

11. A non-transitory computer readable medium storing a program causing a computer to execute a process for character recognition processing, the process comprising:

evaluating confidence of character recognition;

classifying an area of a character into a plurality of components for which the character recognition confidence evaluation is executed when the character recognition confidence of the area is evaluated low, the plurality of components including a character component, a marking component and a ground component, the marking component being defined by an area of the plurality of areas having been marked by a highlighting pen;

performing character recognition processing for each of the components that are classified;

judging the component recognized as the character component when the confidence of the character recognition is high;

locating a background-colored character region from an image;

partitioning the background-colored character region into areas including a character, the background-colored character region being the areas having been marked by the highlighting pen;

performing character recognition for each of the areas including the character partitioned from the background-colored character region; and calculating the confidence of the character recognition for each of the areas including the character partitioned from the background-colored character region, wherein a second area evaluated high in terms of the character recognition confidence falls within the background-colored character region, the region including the area of the character component to be separated.

12. A character recognition processing system, comprising:

a character recognition confidence evaluating unit that evaluates whether confidence of character recognition of a plurality of areas are low or high;

a character area classification unit that classifies a first area evaluated low by the character recognition confidence evaluating unit into a plurality of components;

a character separation unit that separates the components classified by the character area classification unit into a character component and non-character components, according to information relating to a second area evaluated high by the character recognition confidence evaluating unit, the non-character components including a marking component and a ground component, the marking component being defined by an area of the plurality of areas having been marked by a highlighting pen, the plurality of areas having been marked by the highlight pen including areas of a first hue and areas of a second hue, wherein the areas of second hue are darker than the areas of the first hue, and the areas of the second hue include a starting and an ending of the plurality of areas having been marked by the highlighting pen; and a first character recognition unit that performs character recognition processing for the character component separated by the character separation unit, wherein the first area evaluated low by the character recognition confidence evaluating unit include the plurality of areas having been marked by the highlighting pen, and wherein at least one of the above units comprises a hardware module.

* * * * *